United States Patent
Charpentier et al.

(10) Patent No.: US 7,975,852 B2
(45) Date of Patent: Jul. 12, 2011

(54) CENTRIFUGAL DEVICE FOR SUPPLYING PREFORMS WHICH ARE HORIZONTALLY-LAID AND ALIGNED IN SUCCESSION

(75) Inventors: Alain Charpentier, Octeville-sur-Mer (FR); Daniel Diesnis, Octeville-sur-Mer (FR)

(73) Assignee: Sidel Participations, Octeville Sur Mer (FR)

( * ) Notice: Subject to any disclaimer, the term of this patent is extended or adjusted under 35 U.S.C. 154(b) by 929 days.

(21) Appl. No.: 11/876,833

(22) Filed: Oct. 23, 2007

(65) Prior Publication Data
US 2008/0113055 A1 May 15, 2008

(30) Foreign Application Priority Data
Nov. 10, 2006 (FR) .................................. 06 09867

(51) Int. Cl.
*B07C 5/00* (2006.01)
(52) U.S. Cl. ........ 209/523; 209/522; 209/915; 198/391; 198/392
(58) Field of Classification Search .......... 209/522–525, 209/552, 651–653, 915; 198/391, 392, 395, 198/396, 757
See application file for complete search history.

(56) References Cited

U.S. PATENT DOCUMENTS

| | | | | |
|---|---|---|---|---|
| 2,573,824 A | * | 11/1951 | Baker | 209/523 |
| 4,938,082 A | * | 7/1990 | Buckley et al. | 73/865.8 |
| 5,954,185 A | | 9/1999 | Eshelman et al. | |
| 7,669,707 B2 | * | 3/2010 | Kenneway | 198/398 |

FOREIGN PATENT DOCUMENTS

| | | |
|---|---|---|
| EP | 1650143 A1 | 4/2006 |
| EP | 1690813 A1 | 8/2006 |
| WO | 2006084831 A1 | 8/2006 |

* cited by examiner

*Primary Examiner* — Joseph C Rodriguez
(74) *Attorney, Agent, or Firm* — Sughrue Mion, PLLC

(57) ABSTRACT

Centrifugal device (1) of the rotating bowl type for supplying preforms (2*b*), which are horizontally-laid and aligned, from preforms (2*a*) received in bulk, comprising a rotating transport ring (3) delimited by a lateral guide (12) and a central rotary disc (6) in the same direction as the ring and with an axis (8) inclined relative to that of the ring; a mobile member (15) mounted on the lateral guide occupies, as a result of the actuating means (18), an operational position in which the preforms (2*c*) are forced to leave the ring; detection means (19) upstream of the mobile member detect an undesirable preform (2*c*) on the ring and control actuating means for bringing the mobile member into its operational position for the ejection of the undesirable preform.

9 Claims, 3 Drawing Sheets

CENTRIFUGAL DEVICE FOR SUPPLYING PREFORMS WHICH ARE HORIZONTALLY-LAID AND ALIGNED IN SUCCESSION

FIELD OF THE INVENTION

The present invention generally relates to the field of supplying preforms for installations for manufacturing thermoplastic containers, in particular by blow-moulding or stretch blow-moulding of heated preforms, and it relates more specifically to improvements made to centrifugal devices for supplying thermoplastic preforms, which are horizontally-laid and aligned, from preforms received in bulk, said device comprising:

- a substantially horizontal transport ring rotating about an axis,
- a central rotary disc rotating in the same direction as the ring and having an axis inclined relative to that of the ring,
- the disc and the ring being at a distance from one another in a zone for loading the preforms in bulk onto the disc and being substantially tangent in a zone for transferring the preforms from the disc onto the ring located at a higher level than that of the loading zone,
- a lateral guide peripherally surrounding the ring for retaining the preforms transferred onto the ring, and
- an outlet channel open into the peripheral guide and extending substantially tangentially to the ring for the removal of the preforms which are horizontally-laid and aligned.

BACKGROUND OF THE INVENTION

Operators of installations for manufacturing thermoplastic containers, in particular by blow-moulding or stretch blow-moulding of heated preforms require for ever-increasing production rates. Manufacturing rates in the order of 40,000 containers per hour are currently standard today and, in view of requirements from the operators, research is now geared towards higher rates, in the order of 60,000 to 80,000 containers per hour.

As regards the supply of preforms to this type of installation, the conventional arrangements with vertical conveyor, raised hopper and chute for supplying preforms by gravity to the inlet of the installations are naturally able to satisfy the aforementioned rates currently practiced, but are no longer able to sustain the considerably higher production rates provided for the future.

Moreover, the current supply devices are of significant height which not only require very high, and thus costly factories, but also require significant additional equipment (ladders for accessing upper levels, gantries, railings, etc.) capable of ensuring the security of the personnel having to work in the upper sections.

Current research is, therefore, geared towards supply devices at ground level, preferably at waist height, so as to facilitate maintenance and supervision during operation.

It is in this context that centrifugal supply devices of the type mentioned in the preamble have been developed, also known as rotating bowl devices due to their general shape, which have a reduced height and which make it possible to supply, in particular substantially horizontal conveyors with parallel wires or belts, with preforms.

A significant problem which the devices for supplying preforms have to resolve lies in the need to remove undesirable preforms, i.e. in particular out of standard preforms not belonging to the type being treated and having in particular a diameter and/or a length which are different from those of the treated preforms, nested preforms (which may be assimilated into a preform of excessive length), etc. The removal of these undesirable preforms is extremely important as, if they are introduced into the installation for manufacturing containers, they may cause considerable damage to the installation, and even the partial destruction thereof, with the stoppage time and financial losses which are inherent with the repair and/or reconstruction of the damaged parts.

Various arrangements are known for removing undesirable preforms which are adapted to the supply devices currently in standard use, but these arrangements are not adaptable, at least in a simple manner, to the context of centrifugal supply devices.

SUMMARY OF THE INVENTION

The object of the invention is to respond to this demand and to propose improved means which make it possible to eliminate undesirable preforms in centrifugal supply devices, said means having to be, as far as possible, structurally simple and easy to manufacture and implement, to have high operational speed to be capable of satisfying very high manufacturing rates, and not causing substantial modifications to the design and operation of the centrifugal supply devices.

To these ends, the invention proposes a centrifugal device for supplying thermoplastic preforms which are horizontally-laid and aligned, from preforms received in bulk as mentioned in the preamble, which device, being arranged in accordance with the invention, is characterized in that it further comprises:

- a mobile member mounted on the lateral guide downstream, when observed in the direction of rotation of the transport ring, of said transfer zone and upstream of the opening of said outlet channel and adapted for occupying a resting position in which it does not affect the displacement of the preforms driven by the transport ring and an operational position in which the preforms are forced to leave the transport ring,
- actuating means operationally associated with said mobile member to cause its selective displacement between its two resting and operational positions, and
- detection means located upstream of said mobile member and adapted for detecting an undesirable preform present on the transport ring, said detection means being operatively connected to the means for actuating the mobile member in order to actuate the mobile member into its appropriate operational position for the ejection of the undesirable preform, when an undesirable preform is detected.

The proposed arrangement according to the invention may give rise to two principal embodiments according to which the undesirable preform is ejected towards the outside and removed or is ejected towards the inside and returned into the rotating bowl so as to be reintroduced into the batch of preforms to be treated.

Thus, in a first possible embodiment, it is provided:
that the mobile member is a mobile trap and thus advantageously displaceable, in particular pivotable, towards the outside of the lateral guide, which is adapted for closing at least partially an opening made in the lateral guide, and
that the actuating means are adapted for displacing said trap by controlling the detection means and opening said opening of the lateral guide so that the detected undesirable preform is ejected through the opening as a result of the centrifugal force.

Such a device is appropriate for the permanent removal of undesirable preforms such as, in particular, closely nested preforms, out of standard preforms (different diameter and/or length from those of the preforms to be treated, preforms having faults, etc).

However, with regard to the increased speed of operation of the supply device and to the time necessary for operating the trap, it is possible, if the preforms are very close to one another on the transport ring, that not only an undesirable preform is ejected through the trap but also the preform which follows said undesirable preform, and even several preforms which succeed said undesirable preform, and which do not need to be ejected. This results in the removal of preforms which are suitable for being treated, and, to avoid wastage, it is necessary to manually sift through the batch of removed preforms to collect the acceptable preforms and replace them in the circuit.

In such an embodiment, it is advantageous that the device further comprises:

an auxiliary mobile finger arranged upstream of the trap and adapted for occupying a retracted position in which it is not in the trajectory of the preforms on the transport ring and an ejection position for which it is in the trajectory of the preforms on the transport ring and rejects the preforms towards the inside onto the rotary disc, and means for actuating said mobile finger adapted for making said mobile finger occupy selectively one or other of the aforementioned positions, said actuating means being dependent on the detection means such that the mobile finger is in its retracted position during the passage of the detected undesirable preform and in its ejection position during the passage of at least the first preform following the detected undesirable preform, to push back said first preform towards the inside onto the rotary disc.

As a result of this optional arrangement, it is avoided that the acceptable preforms are removed towards the outside and their return into the rotating bowl maintains them in the circuit of the preforms to be treated and only slows down the treatment thereof.

In a further possible embodiment, it is provided that the mobile member is a mobile finger arranged downstream of the aforementioned transfer zone and adapted for occupying, as a result of the actuating means, a retracted position in which it is not in the trajectory of the preforms on the transport ring and an ejection position for which it is in the trajectory of the preforms on the transport ring and rejects the preforms towards the inside onto the rotary disc.

Such a device is appropriate when the fault which makes the preform undesirable is only temporary and not intrinsic and may disappear, for example, as a result of an impact, for example the impact undergone when the preform drops down into the rotating bowl. This device is suitable, most particularly, for preforms which are not closely nested, i.e. preforms having geometries such that the body of one preform may be introduced into the body of the other preform without contact and thus without gripping; it is sufficient to make them drop down into the rotating bowl to separate them.

Such a device avoids, once again without manual intervention, the removal of preforms towards the outside and thus in a permanent manner, which may, however, be treated after eliminating the factor making them temporarily undesirable.

As concerns, more particularly, the nested preforms, it is understood that the fact that the preforms are closely or not closely nested together rests essentially on the geometry of their shape, and above all on the geometry of the shape of their bodies. Operators of installations for manufacturing thermoplastic containers require the operation to be highly universal, i.e. that the installations are adapted for manufacturing different containers from different preforms of which certain types may cause close nesting whilst other types may cause nesting which is not close. For this reason, it may be desirable to increase the universality of the operation of the supply device according to the invention if it is jointly equipped with the two aforementioned ejection devices, i.e. a mobile trap according to any one of the arrangements described above and a mobile finger according to the arrangement explained above, as a result of which the user has the choice between the removal of the undesirable preforms towards the outside through the opening of the lateral guide or towards the inside onto the rotary disc.

In this case, it is possible that the mobile finger is arranged downstream of the mobile trap. However, it may be more advantageous if the mobile finger is arranged downstream of the mobile trap and it thus becomes possible to simplify the structure by providing that the mobile finger is arranged upstream of the mobile trap and is combined with the auxiliary mobile finger for ejecting at least the first preform following the detected undesirable preform when the mobile trap is operational; the actuating means of the finger are thus adapted to the desired type of ejection towards the outside in combination with the trap or towards the inside. In a further variant, also resulting in a simplified structure, the mobile trap is arranged to be able to be displaced on both sides from its resting position so as to assume also the function of the mobile finger.

The arrangements according to the invention which have just been described are structurally simple and do not require significant modifications in the general arrangement of the supply device; as a result they are relatively cheap to implement whilst they have proved to be particularly efficient and reliable. In particular, they offer the advantage of an entirely automatic selection without stopping the rotary disc and are capable of operating efficiently at the high speeds required today for installations with high production rates.

BRIEF DESCRIPTION OF THE DRAWINGS

The invention will be better understood by reading the detailed description which follows of certain preferred embodiments given solely by way of non-limiting examples. In this description, reference is made to the accompanying drawings, in which.

DETAILED DESCRIPTION OF THE INVENTION

Figure 1:
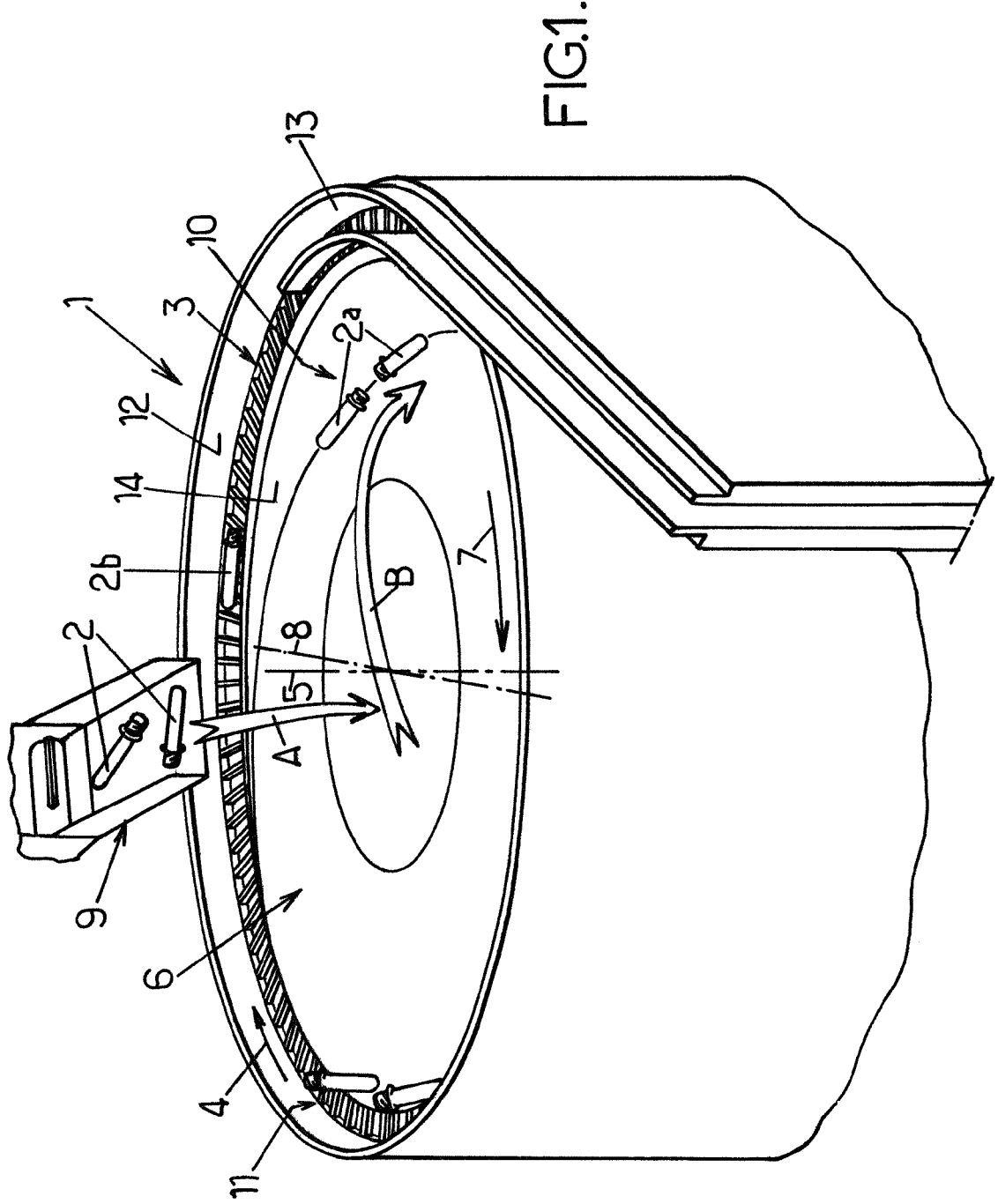
FIG. 1 is a schematic perspective view of a centrifugal supply device for preforms of the type that the invention aims to improve.

A centrifugal device is schematically illustrated in FIG. 1 This centrifugal device, denoted in its entirety by the reference numeral 1, is adapted for supplying preforms 2 made of thermoplastic material such as PET so that the preforms 2 received in bulk in the device (preforms 2a in FIG. 1) are delivered, at the outlet of the device, horizontally-laid and aligned in succession (preforms 2b in FIG. 1).

The device 1 comprises in particular:

a substantially horizontal transport ring 3 rotating (arrow 4) about an axis 5 which is, in particular, substantially vertical, a central rotary disc 6, arranged internally in the transport ring 3 and rotating (arrow 7) in the same direction as the transport ring 3 and having an axis 8 inclined (typically in the order of 10°) relative to that 5 of the transport ring 3, the speed of rotation of the disc 6 being preferably slightly less than that of the transport ring 3, unloading means 9 adapted for delivering preforms 2 in bulk onto the disc 6, which unloading means may be of any appropriate type adapted for supplying the preforms in the required quantity, the disc 6 and the transport ring 3 being at a distance from one another in one zone 10 for loading the preforms 2a in bulk onto the disc 6 and being substantially tangent in another zone 11 for transferring the preforms 2a from the disc 6 onto the transport ring 3 located at a higher level than that of the loading zone 10, a lateral guide 12 peripherally surrounding the transport ring 3 to retain the preforms 2b transferred in the transfer zone 11, from the disc 6 onto the transport ring 3, and an outlet channel 13 open into the peripheral guide 12 and extending substantially tangentially to the transport ring 3 for the removal of the preforms 2b which are horizontally-laid and aligned with one another in succession.

Although this is not imperative, in the preferred embodiment illustrated in FIG. 1 the disc 6 is in line with the circle formed by the vertical projection of the transport ring 3, i.e. it occupies the entire surface surrounded by the transport ring 3.

The preforms 2a supplied in bulk by the unloading means 9 fall onto the disc 6 at any point thereof, for example in the vicinity of the centre as illustrated (arrow A), then, being driven by gravity due to the inclination of the disc 6, slide towards the loading zone 10 (arrow B) where they abut against the wall 14 defining said loading zone whilst beginning to be driven in rotation by the disc 6. Here, driven by the disc 6 in a circular path along the wall 14, they are pushed against and along this wall 14 due to the centrifugal force. Having arrived in the loading zone 11, where the edge of the disc 6 is tangent to the transport ring 3, the preforms 2a, due to the centrifugal force, pass over the transport ring 3 which drives them along the lateral guide 12. During this displacement, the preforms 2b are maintained in a longitudinal position along the lateral guide 12 due to the centrifugal force. Finally, the preforms 2b which are horizontally-laid and aligned in succession are introduced by the transport ring 3 into the inlet of the outlet channel 13 where they are captured by other displacement means.

It will be emphasized that the centrifugal device 1 for supplying preforms 2b which are horizontally-laid and aligned in succession which has just been briefly described, also denoted a rotating bowl supply device, is designed to supply the preforms in the horizontally-laid position aligned in succession, but without a specific orientation of the preforms which extend with the neck towards the front or the neck towards the rear; the preforms are thus supplied equally in one or the other position.

To describe the arrangements that the invention proposes to introduce into the device of FIG. 1 for the purposes of removing the undesirable preforms, reference will now be made to FIG. 2 which reproduces the general arrangement of the device of FIG. 1 with the exception, however, of the unloading means 9 which, although always present (as illustrated by the arrow A which is left in place), have not been illustrated in order to leave room for the representation of the additional means required for implementing the invention.

Figure 2:
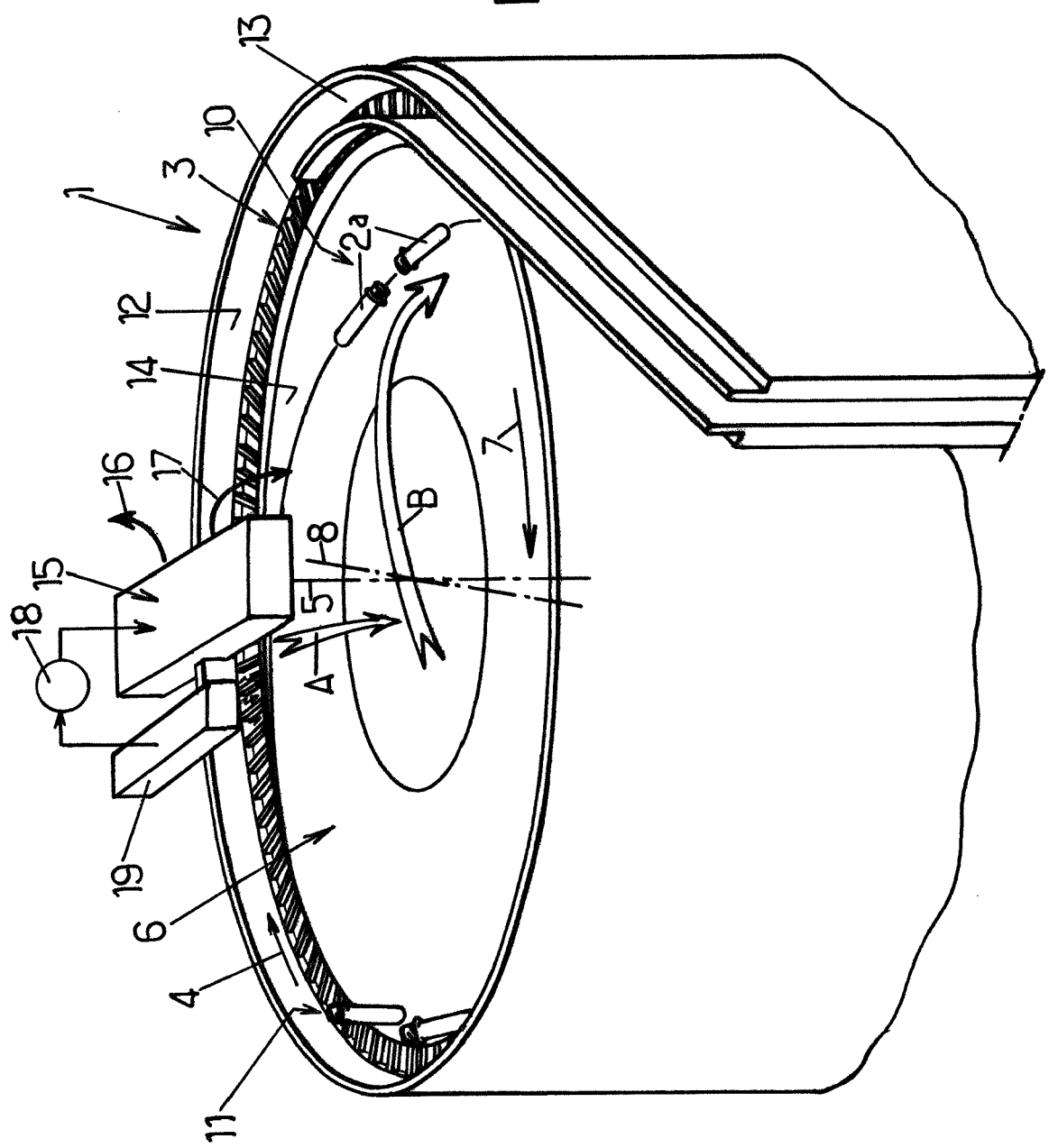
FIG. 2 is a schematic perspective view of a substantial part of the centrifugal supply device of FIG. 1 provided with arrangements according to the invention.

To proceed with the removal of undesirable preforms, (nested preforms, non-standard preforms, misshapen preforms, etc.) the centrifugal supply device 1 comprises, as shown in FIG. 2:

a mobile member 15 mounted on the lateral guide 12 downstream (observed in the direction 4 of rotation of the transport ring 3) of the transfer zone 11 and upstream of the opening of the outlet channel 13 and adapted for occupying:

a resting position in which it does not affect the displacement of the preforms 2b driven by the transport ring 3 and in which, in particular, it ensures the surface continuity with the lateral guide 12, and an operational position in which the preforms 2b which pass to its right are forced to leave the transport ring 3, whether towards the outside of the device (arrow 16) or towards the inside of the device (arrow 17), actuating means 18 functionally associated with said mobile member 15 to cause its selective displacement between its two resting and operational positions, and detection means 19 located upstream of said mobile member 15, but downstream of said loading zone 11, and preferably not at a distance therefrom, and adapted for detecting an undesirable preform present on the transport ring 3, said detection means 19 being operatively connected to the means 18 for actuating the mobile member 15 in order to actuate the mobile member 15 into its appropriate operational position to cause the ejection of the undesirable preform, when an undesirable preform is detected.

Due to the presence of the lateral guide 12, the detection means 19 have to be arranged so that their operation is not disrupted by the presence of the lateral guide 12; in practice, the detection means 19 are located above the transport ring 3 and substantially perpendicular thereto, and are even forcibly displaced towards the centre of the device above the disc 6 with an oblique visual line. As an alternative, the detection means may be placed on both sides of the lateral guide 12 (this embodiment is not shown on the accompanying drawings).

Taking account of the relatively high speed of rotation of the transport ring 3, the available time for the displacement of the mobile member 15 from the moment when the detection means 19 have detected an undesirable preform, it is necessary to arrange actuating means 18 with a very short response time and such that the mobile member 15 has an inertia which is as low as possible.

The detection means 19 may be of any appropriate type according to the accepted criterion (criteria) for removal: for example detection of one dimension of the preforms (typically length and/or transverse dimension of the preforms) detection of the distance between two consecutive preforms, detection of the profile of the preforms which seems the most advantageous solution as being that which provides the most complete information capable of covering several selection criteria.

The arrangements which have just been described may give rise to two principal embodiments, depending on the direction for ejecting undesirable preforms towards the outside (arrow 16) or towards the inside (arrow 17).

Figure 3:
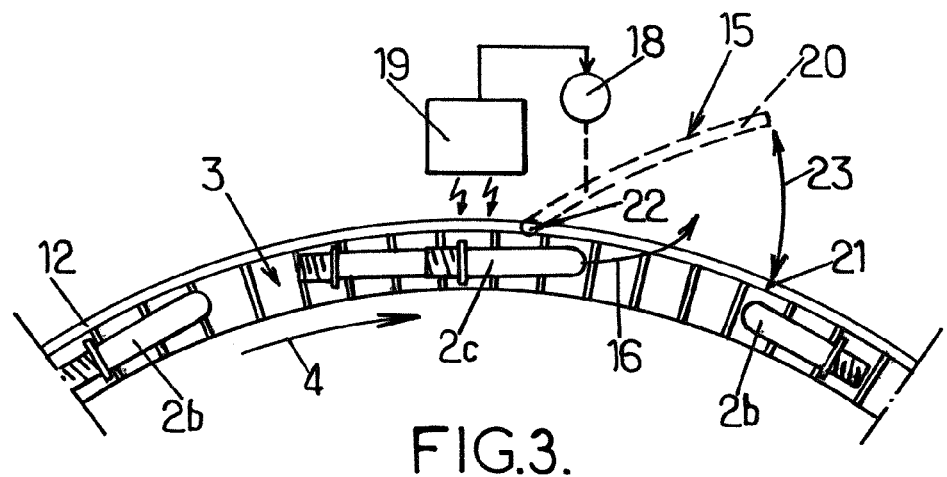
FIG. 3 is a view in larger scale of a part of the centrifugal supply device of FIG. 2 showing a first embodiment according to the invention.

A first possible embodiment is illustrated schematically in FIG. 3 which is a partial view of the transport ring 3, the remainder of the device not being reproduced since it remains identical to that which is shown in FIGS. 1 and 2. In this arrangement, the mobile member 15 is formed by a lateral guide section 12 arranged in the form of a displaceable trap 20 preferably towards the outside and adapted for closing an opening 21 made in the lateral guide 12. More specifically, in a preferred embodiment illustrated in FIG. 3, the displaceable trap 20 is rotatable towards the outside (double arrow 23) about a hinge 22 arranged on the upstream side of the opening 21. The opening 21 and the trap 20 have to have a length at least equal to and preferably substantially greater than the length of the largest preform to be removed; in particular, acting to remove nested preforms 2c as shown in FIG. 3, the length of the opening 21 and the trap 20 has to be at least equal to or substantially greater than that of two nested preforms.

When the detection means 19 detect an undesirable preform, for example two preforms 2c nested together, they control the actuating means 18 which open the trap 20 (in dotted lines in FIG. 3). With regard to the relatively high speed of rotation of the transport ring 3, the preforms are driven along whilst being pushed back against the lateral guide 12 due to the centrifugal force; when the trap 20 is opened in synchronism when a preform detected by the means 19 is present, the undesirable preform 2c, no longer bearing radially during the passage in front of the opening 21, is ejected through said opening towards the outside of the device (arrow 16).

Taking account of the relatively high speed of rotation of the transport ring 3, it is possible that the preform 2b following the undesirable preform 2c which is ejected through the opening 21 is in front of this opening while the trap 20 has not yet been closed. As a result, in particular for faster production rates with preforms 2b in very close succession, one or more preforms 2b which are not undesirable, succeeding an undesirable preform 2c, risk being driven disadvantageously outside the device, which represents unnecessary wastage.

Figure 4:
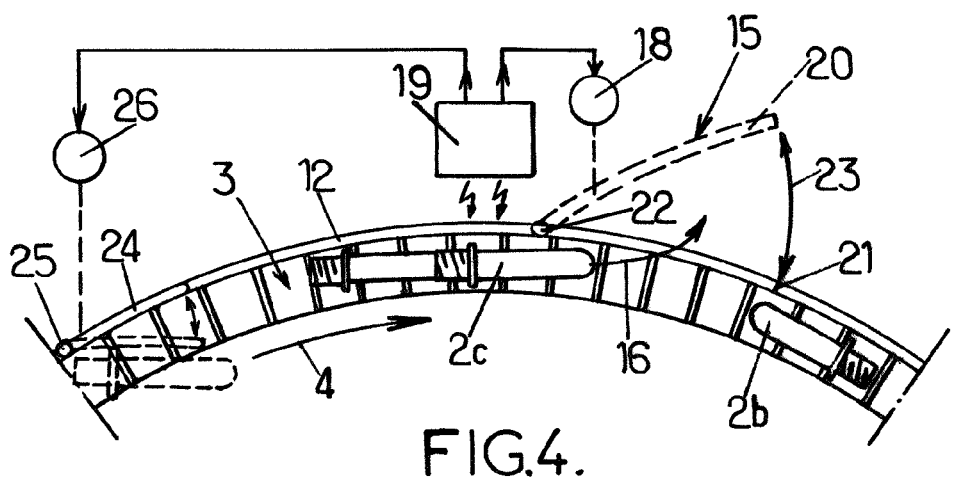
FIG. 4 is a view in larger scale of a part of the centrifugal supply device of FIG. 2 showing a preferred variant of the first embodiment of FIG. 3

To avoid having to embark on manually sorting through the rejected preforms to collect the usable preforms, it is proposed to arrange the centrifugal supply device 1 in the manner shown in FIG. 4. An auxiliary mobile finger 24 is provided upstream of the trap 20 and arranged to be able to occupy selectively a retracted position or resting position (for example in the continuation of the lateral guide 12, shown in solid lines in FIG. 4) and an operational position in which it extends through at least one part of the transport ring 3 (in dotted lines in FIG. 4) such that it is in the trajectory of the preforms on the transport ring and rejects those which face towards the inside of the device where they drop onto the rotary disc 6. The auxiliary mobile finger 24 may advantageously be formed in a simple manner in the form of a lateral guide section 12 which is made to be displaceable, preferably rotatable around a hinge 25 arranged on the upstream side. The auxiliary mobile finger 24 is moved by actuating means 26, themselves controlled by the detection means 19 in synchronism with the trap 20. As a result of this arrangement, the ejection of usable preforms outside the centrifugal supply device is prevented and the preforms diverted by the auxiliary mobile finger 24 are automatically reintroduced into the circuit.

The arrangements which have just been described with regard to FIGS. 3 and 4 are, in particular, intended for the removal of nested preforms, although they are also appropriate for removing undesirable preforms on the basis of other criteria as indicated above. Nevertheless, whilst certain preforms (for example preforms with cylindrical bodies of substantially the same diameter as that of the neck) have a geometry such that they are nested together closely and have to be removed from the installation, preforms also exist (for example preforms with a body with a diameter substantially less than that of their neck) which may be engaged in one another without being nested together closely (not closely nested): the separation of two preforms thus engaged in one another without being closely nested is easy (a simple impact may suffice) and there is no need to remove them.

Figure 5:
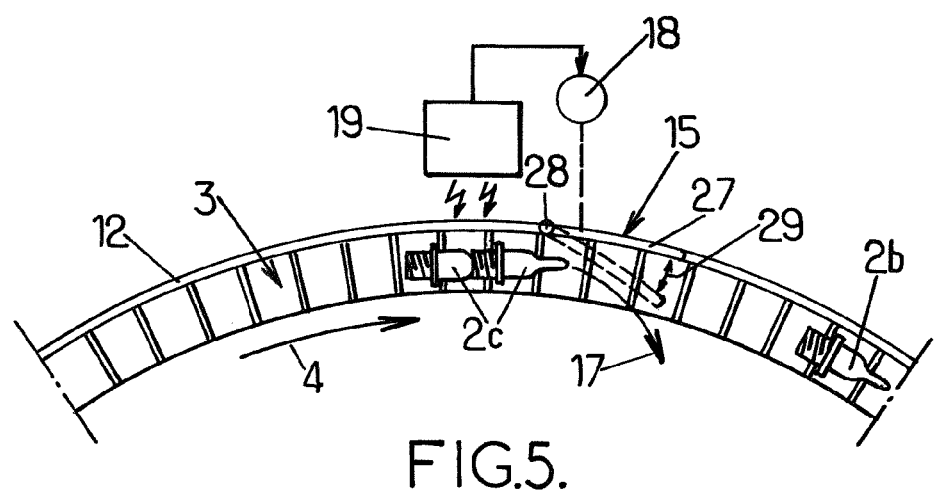
FIG. 5 is a view in larger scale of a part of the centrifugal supply device of FIG. 2 showing a second embodiment according to the invention.

To deal more specifically with this problem, a second possible embodiment of the arrangements of the invention illustrated schematically in FIG. 5 is proposed which is a partial view of the transport ring 3. The mobile member 15 is a mobile finger 27 arranged downstream of the transfer zone 11 and capable of occupying selectively, in relation with the actuating means 18, a retracted position or resting position (for example in the continuation of the lateral guide 12, shown in solid lines in FIG. 5) in which it is not in the trajectory of the preforms on the transport ring 3 and an operational position or ejection position in which it is in the trajectory of the preforms on the transport ring 3 and rejects them towards the inside onto the rotary disc 6. Falling onto the rotary disc 6, the preforms 2c which are not nested closely are separated as a result of the impact. The mobile finger 27 may advantageously be formed simply in the form of a lateral guide 12 section which is made to be displaceable, preferably rotatable (double arrow 29) about a hinge 28 arranged on the upstream side.

The operators of installations for manufacturing containers made of thermoplastic material, in particular PET, by blow-moulding or stretch blow-moulding of preforms demand that their installations operate in a highly universal manner and, in particular, are also able to produce containers of very different types from preforms which are also of very different types. In particular, they may demand that the installations are able to treat equally and selectively preforms with a geometry which promotes being closely nested and preforms with a non-closely nested geometry. In these conditions, it is necessary that the centrifugal supply device for preforms is, itself, arranged for treating the two types of preforms efficiently.

To this end, it is conceivable that the centrifugal supply device for preforms combines the arrangements characterizing the two embodiments described above with regard to FIG. 3 (or its variant of FIG. 4) and of FIG. 5. The operator thus selects the mode of operation of the device according to the type of preforms treated.

Although, in such an arrangement, the position of the mobile finger 27 is irrelevant from the point of view of the functions to be ensured and that this finger may be easily arranged downstream of the mobile trap 20, a simplification of the structure could, however, be obtained by positioning the mobile finger 27 upstream of the trap 20. In this case, more specifically, the mobile finger 27 may also take on the role of the auxiliary mobile finger 24 mentioned above in the arrangement of FIG. 4. It suffices, therefore, to adapt the actuating control of this single finger to the mode of ejection selected, towards the outside or towards the inside of the device.

A further variant, which is advantageous due to the reduction of the number of parts used (mobile parts and drive means), and by the structural simplification which results therefrom, consists in implementing a single mobile trap capable of taking on selectively the role of the trap 20 of the first embodiment above and the role of the mobile finger 27 of the second embodiment above. It suffices that the trap 20 of the first embodiment is capable of being displaced selectively on either side of its resting position or retracted position as a result, in the appropriate direction, of the drive means 18 which may to this end accommodate a control unit, for example, for pre-selecting the function.

What is claimed is:

1. A centrifugal device for supplying thermoplastic preforms, which are horizontally-laid and aligned, from preforms received in bulk, said device comprising:
   a substantially horizontal transport ring rotating about an axis,
   a central rotary disc rotating in the same direction as the transport ring and having an axis inclined relative to that of the transport ring,
   the rotary disc and the transport ring being at a distance from one another in one zone for loading the preforms in bulk onto the rotary disc and being substantially tangent in another zone for transferring the preforms from the rotary disc onto the transport ring located at a higher level than that of the loading zone,
   a lateral guide peripherally surrounding the transport ring for retaining the preforms transferred onto the transport ring,
   an outlet channel open into the lateral guide and extending substantially tangentially to the transport ring for the removal of the preforms which are horizontally-laid and aligned in succession,
   an ejection mechanism mounted on the lateral guide downstream, when observed in the direction of rotation of the transport ring, of said transfer zone and upstream of the opening of said outlet channel and adapted for occupying a resting position in which the ejection mechanism does not affect the displacement of the preforms driven by the transport ring and an operational position in which the preforms are forced to leave the transport ring,
   actuating means, operationally associated with said ejection mechanism, for actuating the ejection mechanism, to cause a selective displacement of the ejection mechanism between said resting and operational positions, and
   detection means located upstream of said ejection mechanism and adapted for detecting an undesirable preform present on the transport ring, said detection means being operatively connected to the means for actuating the ejection mechanism to force the ejection mechanism into the operational position for the ejection of the undesirable preform, when an undesirable preform is detected,
   wherein the ejection mechanism comprises a mobile trap adapted for closing an opening made in the lateral guide,
   the actuating means is adapted for displacing said mobile trap by controlling the detection means and opening said opening of the lateral guide so that the detected undesirable preform is ejected through the opening as a result of the centrifugal force, and
   the mobile trap is displaceable and pivotable towards the outside of the lateral guide.

2. The centrifugal device according to claim 1, further comprising:
   an auxiliary mobile finger arranged upstream of the mobile trap and adapted for occupying a retracted position in which the auxiliary mobile finger is not in the trajectory of the preforms on the transport ring and an ejection position in which the auxiliary mobile finger is in the trajectory of the preforms on the transport ring and rejects the preforms towards the inside onto the rotary disc, and
   means for actuating said auxiliary mobile finger adapted for making said auxiliary mobile finger occupy selectively the retracted position or the ejection position, said actuating means being dependent on the detection means such that the auxiliary mobile finger is in the retracted position during the passage of a detected undesirable preform and in the ejection position during the passage of at least the first preform following the detected undesirable preform, to push back said first preform towards the inside on the rotary disc.

3. The centrifugal device according to claim 1, wherein the ejection mechanism further comprises a mobile finger arranged downstream of the transfer zone and adapted for occupying, in relation to the actuating means, a retracted position in which the mobile finger is not in the trajectory of the preforms on the transport ring and an ejection position in which the mobile finger is in the trajectory of the preforms on the transport ring and rejects the preforms towards the inside onto the rotary disc.

4. The centrifugal device according to claim 1, wherein the ejection mechanism further comprises a mobile finger arranged downstream of the transfer zone and adapted for occupying, in relation to the actuating means, a retracted position in which the mobile finger is not in the trajectory of the preforms on the transport ring and an ejection position in which the mobile finger is in the trajectory of the preforms on the transport ring and rejects the preforms towards the inside onto the rotary disc,
   whereby the user has the choice between the removal of the undesirable preforms towards the outside through the opening of the lateral guide or towards the inside onto the rotary disc.

5. The centrifugal device according to claim 4, wherein the mobile finger is arranged downstream of the mobile trap.

6. The centrifugal device according to claim 4, wherein the mobile finger is arranged upstream of the mobile trap and is combined with an auxiliary mobile finger for ejecting at least the first preform following the detected undesirable preform when the mobile trap is operational.

7. The centrifugal device according to claim 4, wherein the mobile finger is embodied in the mobile trap which is arranged to be displaced on both sides from the resting position to assume the function of the mobile finger.

8. A centrifugal device for supplying thermoplastic preforms, which are horizontally-laid and aligned, from preforms received in bulk, the device comprising:
   a substantially horizontal transport ring rotating about an axis,
   a central rotary disc rotating in the same direction as the transport ring and having an axis inclined relative to that of the transport ring,
   the rotary disc and the transport ring being at a distance from one another in one zone for loading the preforms in bulk onto the rotary disc and being substantially tangent in another zone for transferring the preforms from the rotary disc onto the transport ring located at a higher level than that of the loading zone,
   a lateral guide peripherally surrounding the transport ring for retaining the preforms transferred onto the transport ring,
   an outlet channel open into the lateral guide and extending substantially tangentially to the transport ring for the removal of the preforms which are horizontally-laid and aligned in succession,
   an ejection mechanism mounted on the lateral guide downstream, when observed in the direction of rotation of the transport ring, of the transfer zone and upstream of the opening of the outlet channel and adapted for occupying a resting position in which the ejection mechanism does not affect the displacement of the preforms driven by the transport ring and an operational position in which the preforms are forced to leave the transport ring, actuating means, operationally associated with the ejection mechanism, for actuating the ejection mechanism, to cause a selective displacement of the ejection mechanism between the resting and operational positions, and detection means located upstream of the ejection mechanism and adapted for detecting an undesirable preform present on the transport ring, the detection means being operatively connected to the means for actuating the ejection mechanism to force the ejection mechanism into the operational position for the ejection of the undesirable preform, when an undesirable preform is detected, wherein the ejection mechanism comprises a mobile trap adapted for closing an opening made in the lateral guide, the actuating means is adapted for displacing said mobile trap by controlling the detection means and opening said opening of the lateral guide so that the detected undesirable preform is ejected through the opening as a result of the centrifugal force, the ejection mechanism further comprises a mobile finger arranged downstream of the transfer zone and adapted for occupying, in relation to the actuating means, a retracted position in which the mobile finger is not in the trajectory of the preforms on the transport ring and an ejection position in which the mobile finger is in the trajectory of the preforms on the transport ring and rejects the preforms towards the inside onto the rotary disc, and the mobile finger is embodied in the mobile trap which is arranged to be displaced on both sides from the resting position to assume the function of the mobile finger, whereby the user has the choice between the removal of the undesirable preforms towards the outside through the opening of the lateral guide or towards the inside onto the rotary disc.

9. A centrifugal device for supplying thermoplastic preforms, which are horizontally-laid and aligned, from preforms received in bulk, the device comprising:

a substantially horizontal transport ring rotating about an axis;

a central rotary disc rotating in the same direction as the transport ring and having an axis inclined relative to that of the transport ring, the rotary disc and the transport ring being at a distance from one another in one zone for loading the preforms in bulk onto the rotary disc and being substantially tangent in another zone for transferring the preforms from the rotary disc onto the transport ring located at a higher level than that of the loading zone;

a lateral guide peripherally surrounding the transport ring for retaining the preforms transferred onto the transport ring;

an outlet channel open into the lateral guide and extending substantially tangentially to the transport ring for the removal of the preforms which are horizontally-laid and aligned in succession;

an ejection mechanism mounted on the lateral guide downstream, when observed in the direction of rotation of the transport ring, of the transfer zone and upstream of the opening of the outlet channel and adapted for occupying a resting position in which the ejection mechanism does not affect the displacement of the preforms driven by the transport ring and an operational position in which the preforms are forced to leave the transport ring;

an actuator, operationally associated with the ejection mechanism, which actuates the ejection mechanism, to cause a selective displacement of the ejection mechanism between the resting and operational positions; and a detector located upstream of the ejection mechanism and adapted to detect an undesirable preform present on the transport ring, the detector being operatively connected to the actuator to force the ejection mechanism into the operational position for the ejection of the undesirable preform, when an undesirable preform is detected, wherein the ejection mechanism comprises a mobile trap adapted for closing an opening made in the lateral guide, the actuator is adapted to displace the mobile trap by controlling the detector and opening the opening of the lateral guide so that the detected undesirable preform is ejected through the opening as a result of centrifugal force, and the mobile trap is displaceable and pivotable towards the outside of the lateral guide.

* * * * *